UNITED STATES PATENT OFFICE.

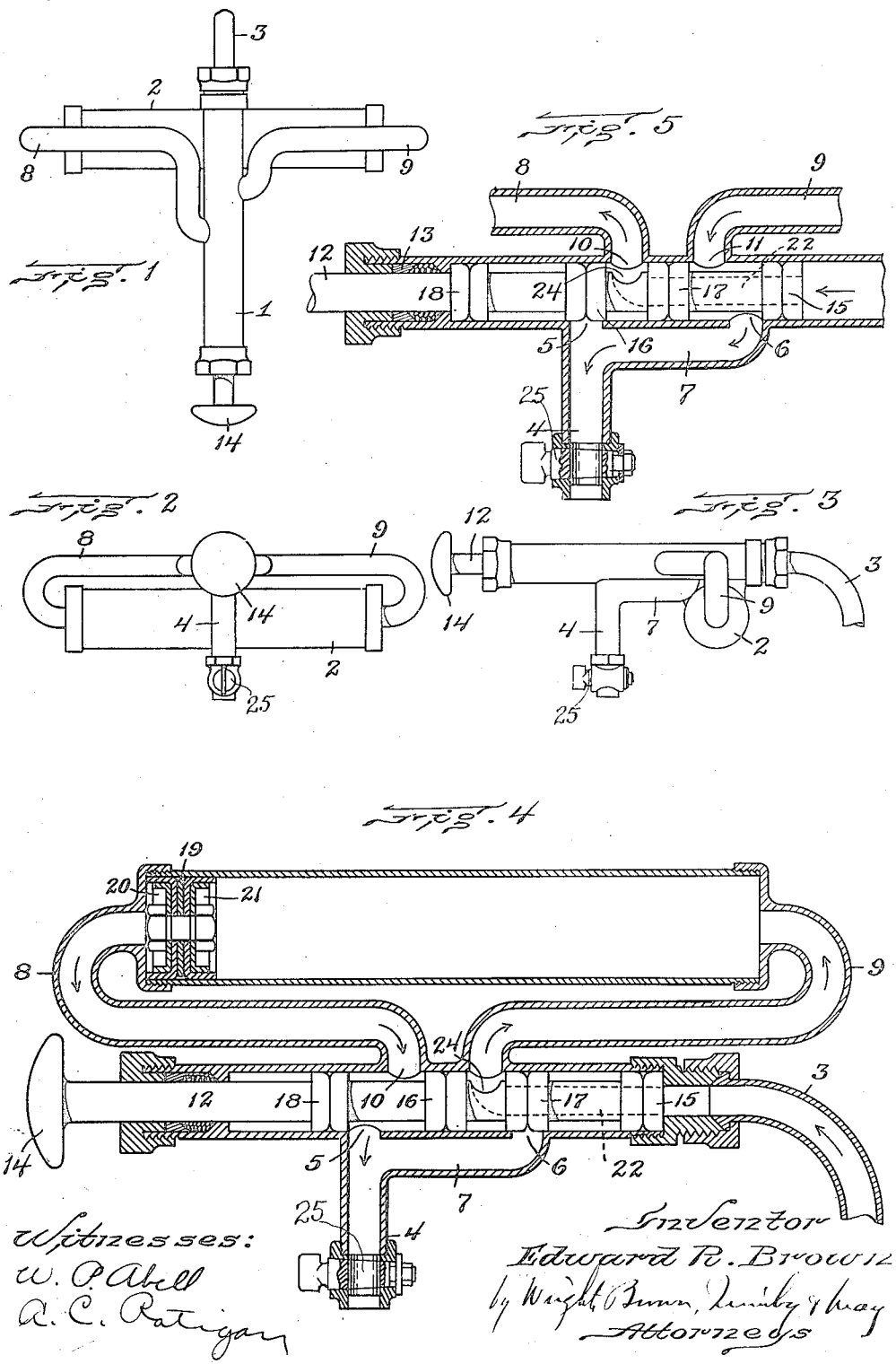

EDWARD R. BROWN, OF BOSTON, MASSACHUSETTS.

MEASURING-FAUCET.

1,225,699.　　　　　　Specification of Letters Patent.　　　Patented May 8, 1917.

Application filed August 27, 1910. Serial No. 579,283.

*To all whom it may concern:*

Be it known that I, EDWARD R. BROWN, of Boston, in the county of Suffolk and State of Massachusetts, have invented certain new and useful Improvements in Measuring-Faucets, of which the following is a specification.

This invention relates to faucets for measuring out definite quantities of carbonated beverages or other liquids under pressure, the object being to accomplish the delivery of a specified quantity of the liquid in a vessel of indeterminate size, and thereby avoid the necessity of first drawing the liquid into a measure and then pouring it into the final receptacle with the attendant loss of gas from the carbonated liquid. This device is designed to cause exactly the specified quantity to be discharged from the spout of the measuring device and the flow then to cease, this result being accomplished by the manipulation of a single valve only, and without the necessity of taking care. One of the objects therefore is to provide a measuring device for liquids which is automatic after the first movement is given to the valve.

The invention consists in a valve chamber, a valve therein, and a measuring chamber. The valve chamber has an inlet and an outlet which are not in direct communication, and the measuring chamber has a longitudinally movable piston or plug and an inlet near each end, the plug serving to interrupt the communication between the two inlets. The inlets of the measuring chamber are connected by pipes with ports in the valve chamber, and the valve in the latter has a number of packings which close the chamber at different points so that when moved into the appropriate position, either of the pipes leading to the measuring chamber will be in communication with the inlet to the valve chamber, while the other communicates with the outlet therefrom, the valve being movable so that this relative arrangement is reversed.

Of the accompanying drawings,—

Figure 1 represents a plan view of a device embodying the principles of my invention.

Fig. 2 represents a front elevation of the same.

Fig. 3 represents a side elevation of the same.

Fig. 4 represents a longitudinal sectional diagrammatic view showing the relative arrangement of the ports in the valve chamber, the packings on the valve, and the connections with the measuring chamber and representing the measuring chamber as brought into the same plane with the valve chamber, the valve being in one of its extreme positions, permitting outflow of the liquid.

Fig. 5 represents a view showing part of the elements illustrated in Fig. 4, the valve being, however, in the other extreme position.

The same reference characters indicate the same parts in all the figures.

Referring to the drawings, 1 represents the valve chamber and 2 the measuring chamber, these being preferably arranged at right angles to one another, and the measuring chamber being near the rear end of the valve chamber. The liquid to be measured flows from its container (not shown) through the inlet pipe 3 which opens preferably into the rear end of the valve chamber. An outlet spout 4 is provided from the valve chamber, this spout communicating with the interior of the chamber through ports 5 and 6 which are connected by a by-pass 7, both ports thus opening into the spout.

The opposite ends of the measuring chamber 2 are connected with the valve chamber by pipes 8 and 9 respectively which open into the valve chamber through ports 10 11 respectively in the sides thereof. These ports are preferably nearer together than the ports 5 and 6, and symmetrically arranged with respect thereto. That is, the ports 10 and 11 are contained between the transverse zones of the valve casing in which the ports 5 and 6 are located.

A valve 12 is located in the valve chamber 1. This consists of a spindle or stem passing longitudinally into the chamber through a stuffing box 13 at the front end of the latter and having a knob or handle 14 by which it may be manually operated. This valve stem is of less transverse dimension than the interior of the valve chamber, so as to permit flow of the fluid around it, and has a number of enlargements which are preferably leather cup packings, fitting closely into the chamber. One of the packings, as 15, is arranged between the port 6 and the inlet pipe 3 so as to prevent flow of the fluid directly from the supply pipe to the spout. In front of this packing is a pair of packings 16 and 17 separated by a distance sufficient to permit flow of liquid between them, and arranged so that the space between them may be brought into registry with either of the ports 10 or 11. Another packing 18 is provided to supplement the effect of the stuffing box in preventing escape of the liquid through the end of the valve chamber, but this packing may, if desired, be omitted.

In the measuring chamber 2 is a piston 19 having packing cups 20 and 21, which is movable longitudinally of the chamber and acts as a plug to prevent free course of liquid through the same. There is a passage or channel 22 formed longitudinally in the valve 12 and wholly contained within the walls thereof, passing from the end nearest to the inlet pipe 3 and opening in a port 24 between the packings 16 and 17.

The operation of the apparatus is as follows. When the valve is in either one of its extreme positions, the port 24 in the valve is in registry with one of the ports 10 or 11, and the other port is at the same time put in communication with the outlet 4. This allows the fluid under pressure to enter one end of the measuring cylinder and to force the liquid in the space between the piston 19 and the opposite end of the cylinder out through the delivering spout, moving the piston 19 from one end to the other of the measuring chamber while doing so. When the piston reaches the end of the chamber it stops, and the flow from the spout ceases. The interior of the measuring cylinder from the piston to the end from which the latter previously moved is now full of the liquid which is ready to be discharged by a reversal of the valve and of the direction in which the liquid flows to the measuring cylinder. To illustrate this action upon the drawings, Fig. 4 shows the valve in its innermost position, whereby the inlet is in communication with the pipe 9 and the outlet communicates with pipe 8. The pressure then is in the direction of the arrows, but the flow of fluid is stopped, because the piston 19 is then at the extreme left-hand end of the measuring cylinder and can go no farther. When the valve is pulled in its outermost position, as shown in Fig. 5, the port 24 is in line with port 10, thereby putting pipe 8 and the left-hand end of the measuring cylinder into communication with the inlet pipe 3, the right-hand end of the measuring chamber and pipe 9 being connected with the outlet spout 4 through the ports 11 and 6, and the by-pass 7. The flow following the direction of the arrows in Fig. 5, then causes the piston to move to the right, forcing the quantity of liquid which is between the piston and the right-hand end of the cylinder out through the spout. When the piston reaches the right-hand end of the chamber 3 it can go no farther, and the flow stops.

Upon pushing the valve inward, the flow is again reversed and another quantity of liquid is expelled.

Thus the device is adapted to measure out equal quantities of the liquid indefinitely by simply moving the valve in and out, a single movement in one of these directions being sufficient to cause discharge of the liquid. The quantity is measured by the size of the measuring cylinder and the distance through which the piston is permitted to travel.

It will be noted that the governor for controlling the flow of the liquid is a four-way valve, of which the inlet is one channel, the outlet the second, and the pipes 8 and 9 the other two. The flow of the liquid is from the inlet through the circuit consisting of the measuring chamber 2 and the pipes 8 and 9, and out from the spout 4, the direction of flow through the circuit 2 8 9 being governed by the position of the valve.

In the outlet 4 of the faucet I propose to insert a cock 25 to prevent dripping. In the drawing this cock and the outlet are shown as relatively near to the measuring valve, but it is not essential that they be placed thus close together, for it is sometimes advisable to have the outlet and cock arranged as a tap at some distance from the measuring part of the apparatus. Therefore I reserve the right to insert as great a length of piping as may be needed between the valve chamber 1 and the tap, and to lead such piping in any direction desired.

I claim:—

1. A valve casing having an inlet and an outlet, and having two intermediate ports opening into its interior, passages exterior to said casing leading from said ports, a valve having packings arranged to prevent flow of liquid directly from the inlet to the outlet, and a pair of packings spaced to correspond with the distance between said ports, the valve having also an inclosed channel leading from the inlet side of the first packing to the space between said pair of packings and being movable to register such channel with either of said ports, at the same time closing the passage leading from said port to the outlet and opening the passage leading from the other port to the outlet.

2. A valve comprising a casing and a spindle of less diameter than the bore of the casing movable longitudinally in the casing, said casing having an inlet at one end and four ports in its sides located in different longitudinal zones, and the spindle having four spaced apart packings making liquid-tight engagement with the sides of the casing, and said spindle having a port between the middle packings and an opening through its inner end, said opening extending to the port in the spindle.

3. A four-way valve comprising a casing having an end opening and four side ports in different longitudinal locations, a valve spindle of a less diameter than the bore of the casing movable endwise in said casing and having a passage extending from its end adjacent the end opening of the casing to a port in its side, packings carried by said spindle on respectively opposite sides of said last named port, and additional packings carried by the spindle between the respective ends of the casing and the side ports of the casing.

4. A four-way valve comprising a casing having an inlet, two ports constituting entrances to an external circuit, and two outlet ports, and a controller having a plurality of closures arranged with passages between them, one of said passages being always in connection with the inlet, and the controller being so movable as to place the latter passage in registry with each circuit port alternately; the closures being located to put the other circuit port than that which registers with such passage in connection with one of the outlet ports, in either position of the controller, and to close the other outlet port.

In testimony whereof I have affixed my signature in presence of two witnesses.

EDWARD R. BROWN.

Witnesses:
ARTHUR H. BROWN,
P. W. PEZZETTI.